Dec. 16, 1969    H. VAN SOMEREN ET AL    3,483,775
SPEED CONTROL APPARATUS FOR LATHE
Filed Feb. 23, 1968    3 Sheets-Sheet 3
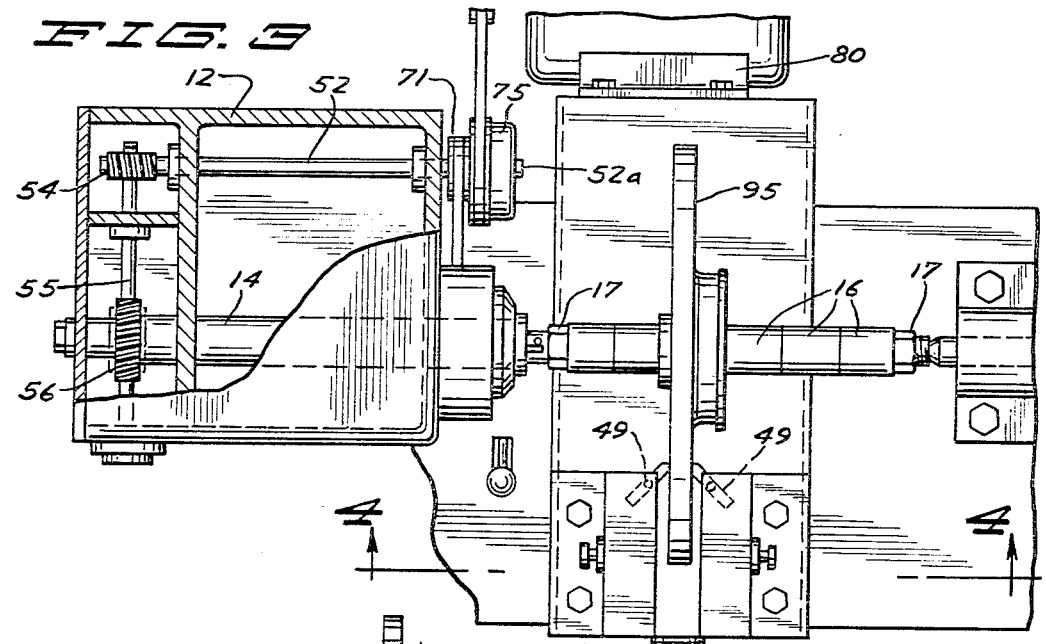
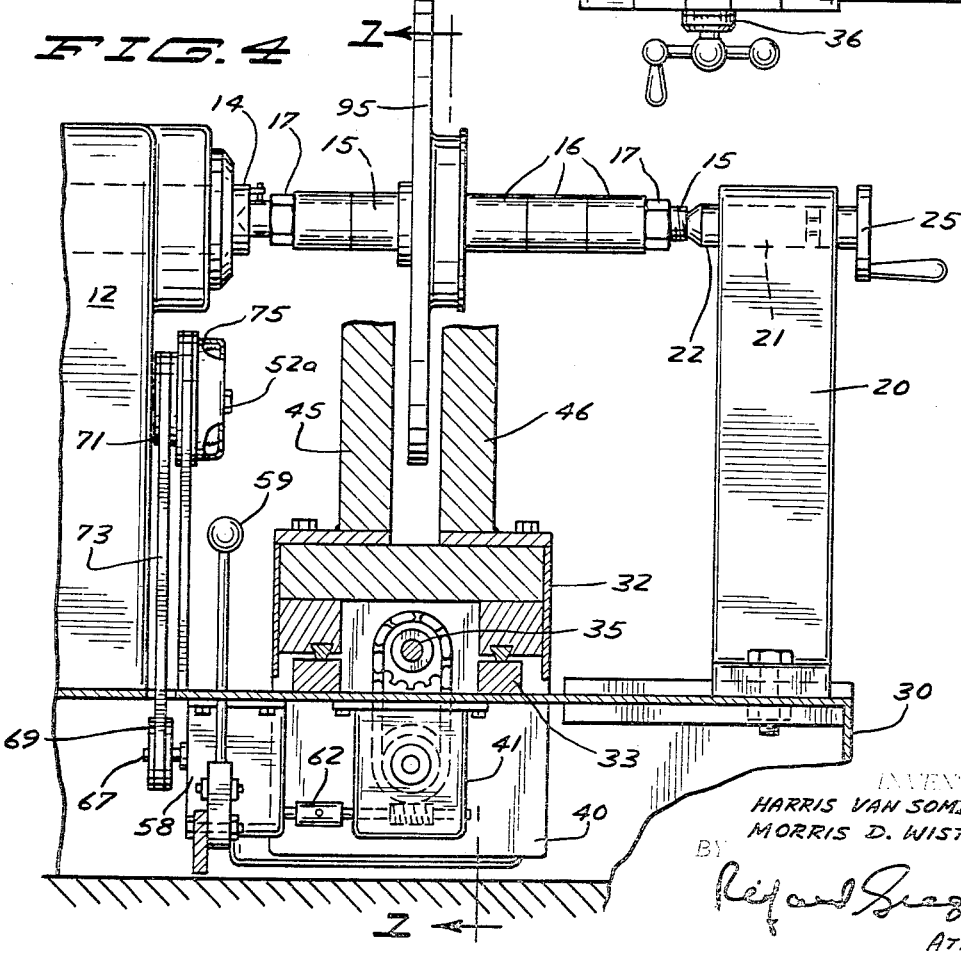
INVENTORS
HARRIS VAN SOMEREN
MORRIS D. WISTI
BY
Richard Gregory
ATTORNEYS United States Patent Office 3,483,775
Patented Dec. 16, 1969

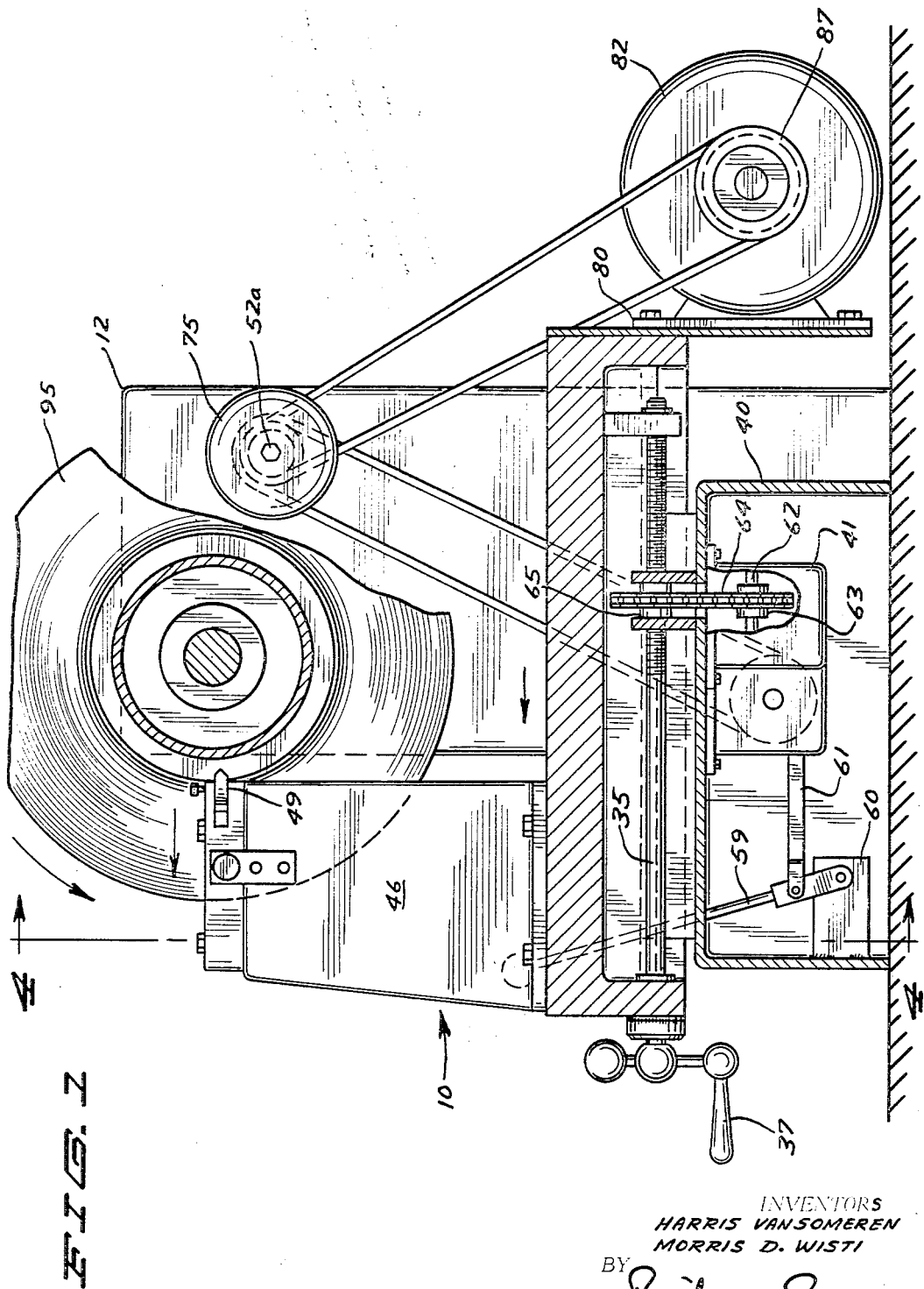

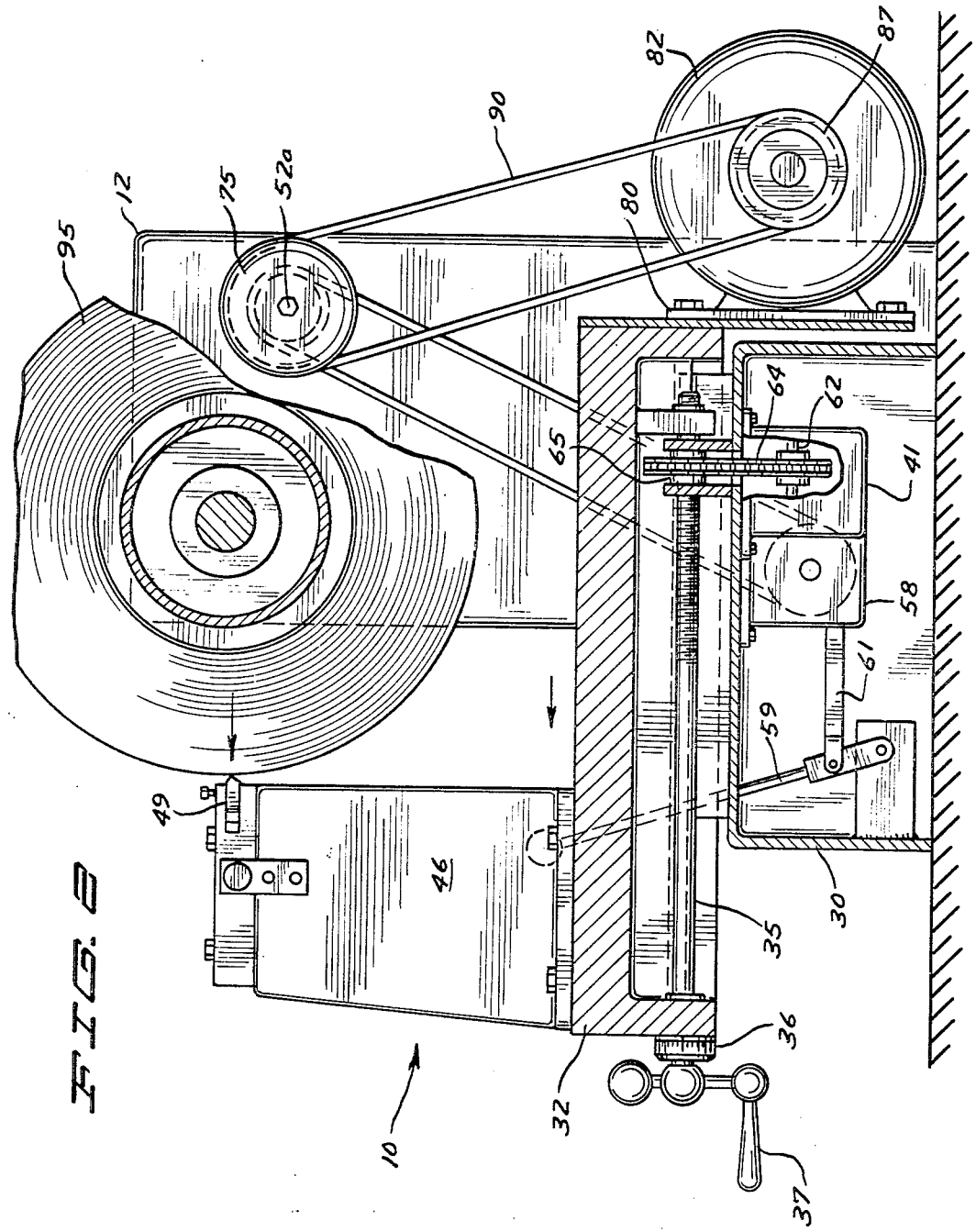

3,483,775
SPEED CONTROL APPARATUS FOR LATHE
Harris Van Someren and Morris D. Wisti, Minneapolis, Minn., assignors to Star Machine & Tool Co., Minneapolis, Minn., a corporation of Minnesota
Filed Feb. 23, 1968, Ser. No. 707,548
Int. Cl. B23b *3/00, 7/00, 9/00*
U.S. Cl. 82—2                                    3 Claims

ABSTRACT OF THE DISCLOSURE

An apparatus comprising a lathe for varying the speed at which a piece of work is being rotated to maintain a substantially constant surface feet per minute of travel across the cutting tool while the work is being executed consisting of a carriage carrying a cutting tool and carrying a pulley equipped motor, a housing carrying a work piece supporting means and having a shaft having a driving connection with said motor, pulley equipped means moving said carriage, a constant and a variable pulley carried by said shaft, a belt passing over said variable pulley and over the pulley of said motor, a second belt passing over said constant pulley and said pulley of said carriage moving means, the effective speed of said variable pulley varying with the movement of said carriage.

BACKGROUND AND SUMMARY OF THE INVENTION

In machining or refacing a disc type work piece such as the rotor of a disc brake, it is desirable to maintain a substantially constant surface feet per minute travel of the face of the work piece across the cutting tool, or in other words to have a substantially constant travel of surface feet per minute cutting speed which provides for the highest quality of machined surface and for the greatest length of cutting tool or tool bit life. As the diameter at the point where the bit is working is increased with reference to the axis of the work piece, the revolution of the shaft speed per minute is decreased to automatically reduce the speed as the bit progresses from adjacent the axis of the work piece toward the periphery thereof.

With respect to known art, the U.S. Letters Patents 2,489,725 to Rutemiller and 2,209,037 to Riegger show the use of pairs of variable pulleys with electrical control means, and U.S. Letters Patent 2,271,598 shows the use of stepless regulation of cutter speed by the use of gears.

The invention herein represents an unobvious improvement is providing a simplified apparatus for speed regulation in which only one variable pulley is used and the progress of the work serves to adjust the pulley automatically for the regulation of the working speed.

It is an object of this invention to provide a simply constructed and automatically actuated means to maintain a substantially constant surface speed of cutting feet per minute across a cutting tool moving across the face of a circular work piece.

It is another object of this invention to provide for controlling lathe cutting speed by means of a single variable pulley having its effective diameter adjusted by the travel of the cutting tool in execution of the work.

It is more specifically an object of this invention to provide for controlling lathe cutting speed with respect to refacing a circular work piece by means of a pulley carried by the carriage moving the cutting tool, a variable pulley mounted on a shaft having driving connection with the work piece holding means and the means for moving the carriage, and a belt passing over said pulleys, the movement of said carriage varying the distance between said pulleys whereby by means of said belt, the effective diameter of said variable pulley is changed to regulate the speed of the work piece holding means to maintain a substantially constant surface feet per minute travel of said work piece across the cutting tool.

These and other objects and advantages of the invention will be set forth in the following description made in connection with the accompanying drawings in which like reference characters refer to similar parts throughout the several views and in which:

FIG. 1 is a view in vertical longitudinal section taken on line 1—1 of FIG. 4 as indicated, with a portion thereof being broken away;

FIG. 2 is a view similar to FIG. 1 showing an alternate position;

FIG. 3 is a view in horizontal section with portions thereof being broken away; and FIG. 4 is a view in cross section as indicated, with portions being broken away.

DESCRIPTION OF A PREFERRED EMBODIMENT

With reference to the drawings, a machine tool comprising a lathe for facing purposes is indicated generally by the reference numeral 10. The lathe with the exception of the subject matter of the invention herein represents conventional arrangement of structure.

Said lathe consists of a headstock 12 having a spindle 14 and an arbor 15 in connection therewith. Carried on said arbor are spacing collars 16 and lock nuts 17 at either end thereof to secure said collars.

In opposed relation to said headstock is a tailstock 20 having a spindle 21 with a center 22 and a handwheel 25 for adjusting said spindle. Said arbor is carried between said spindle 14 and said center 22 and will be driven by said spindle 14.

Said headstock and tailstock are supported on a bed 30. Mounted on said bed in a conventional manner is a carriage or cross slide 32 movable on ways 33 and being moved by a lead screw 35 having in connection therewith a lead screw lock 36 and an operating handle 37. Underlying said bed and said cross slide is a housing 40 containing a feed gear box 41.

Upstanding from said cross slide are transversely spaced tool posts 45 and 46 arranged respectively to carry tool bits or cutting tools 49.

As indicated in FIG. 3, said headstock has journaled therein a shaft 52 having a projecting portion 52a and at its inner end having a worm not seen driving a bevel gear 54 carried by a cross shaft 55 and gear train not shown driving a bevel gear 56 which is secured to and drives the spindle 14.

Carried by said housing 40 is a reduction gear box 58 such as the one well known under the trademark Zeromax having a control handle 59 in connection therewith pivoted at its lower end to a plate 60 as indicated, and having pivoted thereto an operating rod or link 61 connected to said gear box to control the adjustment of gear ratios therein. A connecting shaft 62 runs from said gear box 58 to the feed gear box 41 having secured thereto therein a sprocket 63 having a belt or chain 64 pass thereover and over a sprocket 65.

Carried on a shaft 67 extending from said gear box 58 is a pulley 69 which may be a V pulley. Carried on said shaft extension 52a is a pulley 71. Passing over said pulleys 69 and 71 is a belt 73.

Adjacent to said pulley 71 on said shaft extension 52a is a self variable or expandible pulley 75 shown here as being of a conventional spring loaded design.

Secured to the rear wall of said cross slide 32 is a mounting bracket 80 carrying driving means 82 shown as an electric motor which will be connected to a suitable source of current, and said motor provides the power to operate said lathe 10. Carried on the shaft 83 of said motor is a pulley 87. Passing over said pulley 87 and over said variable pulley 75 is a belt 90.

Shown in operating position is a work piece 95 which here represents a rotor of a disc brake and requires uniform refacing at either side thereof.

OPERATION

The use of the single variable pulley described in connection with the above structure provides a simple, positive and efficient automatic control of the speed of the headstock spindle. The cross slide which carries the cutting tools also carried the driving motor and pulley with a belt passing over this pulley and the variable pulley. The forward movement of the cross slide decreases the distance between the pulleys with the effective diameter of the variable pulley increasing in taking up the belt and thus reducing the speed on the headstock spindle, which spindle is operatively connected with said variable pulley. This combination represents the essential subject matter of the invention herein.

A work piece 95 is secured onto the arbor 15 in a conventional manner, as by the use of screws. The cross slide 32 will be positioned to place the tool bits 49 adjacent the hub or center portion of the work piece and the tool bits will progress toward the periphery of the work piece.

By way of illustration, the tool bit will be positioned on the work piece 95 and the rotation of the work piece at this point will define a circle having a given diameter. The work piece at its periphery defines a circle having a larger diameter.

To have a uniformly machined surface, there must be a substantially constant foot per minute travel of the surfaces of the work piece across the tool bits. It is quite obvious that with a given constant speed of rotation at the axis of the work piece, there will be an increase in the foot per minute travel speed in the direction of the periphery.

With the commencement of the work, the cross slide will move from the starting position as shown in FIG. 1. At such position, the belt 90 will be of such length in passing over the variable pulley 75 and the pulley 87 as to cause said variable pulley to have a desired effective starting diameter. As the cross slide moves forwardly, the distance between the pulleys 75 and 87 decreases with a resulting increase in the effective diameter of the variable pulley. This leads to a reduction in speed of the shaft 52a and a consequent reduction in speed of the headstock spindle and in the speed of rotation of the work piece driven by the spindle. Thus the continuing increase in the effective diameter of the variable pulley as the work progresses causes or results in an accompanying decrease of speed of rotation of the work piece at its axis but a substantially constant foot per minute of surface travel speed of the work piece across a tool bit at the progressive points at which the surface of the work piece and the tool bit have engagement.

The actual speed of travel of the surface of the work piece in passing over a tool bit in view of the apparatus described will be a matter of determination that is known in the art. The invention herein provides apparatus for maintaining a substantially constant cutting speed of the work piece passing over the tool bit or cutting tool.

The apparatus has been very successful in operation and the simplicity of using only one variable pulley for a control element has permitted the use of conventional equipment in connection therewith to provide a relatively low cost and very efficient apparatus.

Thus there has been presented a simply constructed device for maintaining by means of a simple control a uniform condition for machining surfaces of rotating work pieces.

It will of course be understood that various changes may be made in the form, details, arrangement and proportions of the parts, without departing from the scope of the invention herein which, generally stated, consists of an apparatus capable of carrying out the objects above set forth in the parts and combinations of parts disclosed and defined in the appended claims.

What is claimed is:

1. A lathe comprising a housing, means carried by said housing rotatably supporting a work piece, a movable carriage in connection with said housing having in combination:

driving means carried by said carriage,
a pulley carried by said driving means,
a shaft carried by said housing,
a pulley carried by said shaft,
one of said pulleys comprising a variable pulley,
a belt passing over said pulleys,
a second pulley carried by said shaft,
means drivingly connecting said shaft and said first mentioned means,
said carriage riding on a base member,
a shaft carried by said base member having a driving connection with said carriage,
a pulley carried by said shaft,
a belt passing over said second pulley and over said last mentioned pulley, and
said carriage traveling in a direction to vary the distance between said first and second mentioned pulleys whereby said first mentioned pulley belt varies the speed of said first mentioned shaft by varying the effective diameter of said variable pulley.

2. A lathe comprising a housing, means carried by said housing rotatably supporting a work piece, a movable carriage in connection with said housing having in combination:

driving means carried by said carriage,
a pulley carried by said driving means,
a shaft carried by said housing,
means operatively connecting said shaft and said work supporting means,
a pulley carried by said shaft,
one of said pulleys comprising a variable pulley, and
a belt passing over said pulleys whereby the effective diameter of said variable pulley is determined by the movement of said carriage traveling in a direction to vary the distance between said pulleys.

3. The structure set forth in claim 2, including:

means carried by said carriage machining said work piece,
a base member supporting said carriage,
a shaft carried by said base member having a driving connection with said carriage,
a pulley carried by said last mentioned shaft,
a second pulley carried by said first mentioned shaft, and
a belt passing over said second pulley on said first mentioned shaft and over said pulley carried by said last mentioned shaft.

References Cited

UNITED STATES PATENTS 2,103,464 12/1937 Judelshon.
2,394,209 2/1946 Scuse _____ 82—2

LEONIDES VLACHOS, Primary Examiner

U.S. Cl. X.R.

82—21, 29